United States Patent
Eline

(10) Patent No.: US 9,876,959 B2
(45) Date of Patent: Jan. 23, 2018

(54) DRONE PROVIDED WITH A VIDEO CAMERA AND MEANS FOR COMPENSATING FOR THE ARTEFACTS PRODUCED AT THE HIGHEST ROLL ANGLES

(71) Applicant: Parrot Drones, Paris (FR)

(72) Inventor: Pierre Eline, Arnouville (FR)

(73) Assignee: PARROT DRONES, Paris (FR)

( * ) Notice: Subject to any disclaimer, the term of this patent is extended or adjusted under 35 U.S.C. 154(b) by 0 days.

(21) Appl. No.: 15/004,733

(22) Filed: Jan. 22, 2016

(65) Prior Publication Data
US 2016/0219223 A1    Jul. 28, 2016

(30) Foreign Application Priority Data
Jan. 26, 2015   (FR) ...................... 15 50568

(51) Int. Cl.
*H04N 5/228*   (2006.01)
*H04N 7/18*    (2006.01)
(Continued)

(52) U.S. Cl.
CPC ......... *H04N 5/23287* (2013.01); *A63H 27/12* (2013.01); *A63H 30/04* (2013.01);
(Continued)

(58) Field of Classification Search
CPC ........... H04N 5/23287; H04N 5/23238; H04N 5/23258; H04N 5/2257; H04N 5/347;
(Continued)

(56) References Cited

U.S. PATENT DOCUMENTS 8,903,568 B1 *  12/2014  Wang ..................... B64C 19/00
                                              244/189
9,280,038 B1 *  3/2016   Pan ...................... G03B 17/561
(Continued)

FOREIGN PATENT DOCUMENTS

EP   2031864 A1   4/2009
EP   2613214 A1   10/2013

OTHER PUBLICATIONS

Anonymous: "The New Parrot Bebop Drone Built for Stabilized Aerial Video explora", 201-10-06, XP055233862, p. 1-3.
(Continued)

*Primary Examiner* — Chia-Wei A Chen
*Assistant Examiner* — John H Morehead, III
(74) *Attorney, Agent, or Firm* — Haverstock & Owens LLP

(57) ABSTRACT

The drone comprises a camera, an inertial unit measuring the drone angles, and an extractor module delivering data of an image area (ZI) of reduced size defined inside a capture area (ZC) of the sensor. A feedback-control module dynamically modifies the position and the orientation of the image area inside the capture area, in a direction opposite to that of the angle variations measured by the inertial unit. The sensor may operate according to a plurality of different configurations able to be dynamically selected, with a base configuration using a base capture area (ZCB) for low values of roll angle (θ), and at least one degraded mode configuration using an extended capture area (ZCE) of greater size than the base capture area (ZCB), for high values of roll angle (θ).

2 Claims, 7 Drawing Sheets

(51) Int. Cl.

| | |
|---|---|
| *H04N 5/232* | (2006.01) |
| *A63H 27/00* | (2006.01) |
| *A63H 30/04* | (2006.01) |
| *B64C 39/02* | (2006.01) |
| *H04N 5/345* | (2011.01) |
| *H04N 5/347* | (2011.01) |
| *B64C 27/08* | (2006.01) |
| *B64D 47/08* | (2006.01) |
| *H04N 5/225* | (2006.01) |

(52) U.S. Cl.
CPC ............ *B64C 27/08* (2013.01); *B64C 39/024* (2013.01); *B64C 39/028* (2013.01); *B64D 47/08* (2013.01); *H04N 5/2257* (2013.01); *H04N 5/2327* (2013.01); *H04N 5/23238* (2013.01); *H04N 5/23258* (2013.01); *H04N 5/23274* (2013.01); *H04N 5/347* (2013.01); *H04N 5/3454* (2013.01); *B64C 2201/024* (2013.01); *B64C 2201/108* (2013.01); *B64C 2201/127* (2013.01)

(58) Field of Classification Search
CPC ............ H04N 5/2327; H04N 5/23274; H04N 5/3454; B64D 47/08; B64C 27/08; B64C 39/024; B64C 39/028; B64C 2201/024; B64C 2201/127; B64C 2201/108; A63H 27/12; A63H 30/04
See application file for complete search history.

(56) References Cited

U.S. PATENT DOCUMENTS

| | | | |
|---|---|---|---|
| 2011/0128350 A1 | 6/2011 | Oliver et al. | |
| 2014/0336848 A1* | 11/2014 | Saund | G08G 1/054 701/3 |
| 2015/0207964 A1* | 7/2015 | Bye | H04N 5/2251 348/211.99 |
| 2015/0316927 A1* | 11/2015 | Kim | G03B 15/006 701/2 |

OTHER PUBLICATIONS

Gurtner A. et al., "Investigation of Fish-Eye Lenses for Small-UAV Aerial Photography", vol. 47, No. 3,, Mar. 1, 2009, pp. 709-721, XP011250695.

\* cited by examiner

DRONE PROVIDED WITH A VIDEO CAMERA AND MEANS FOR COMPENSATING FOR THE ARTEFACTS PRODUCED AT THE HIGHEST ROLL ANGLES

The invention relates to the processing of digital images captured by a camera on board a mobile device, in particular in a motorized flying machine such as a drone.

The invention advantageously applies to the images acquired by the front camera of a rotary-wing drone such as a quadricopter.

The AR.Drone 2.0 or the Bebop Drone of Parrot SA, Paris, France are typical examples of such quadricopters. They are equipped with a series of sensors (accelerometers, 3-axe gyrometers, altimeter), a front camera capturing an image of the scene towards which the drone is directed, and a vertical-view camera capturing an image of the overflown ground. They are provided with multiple rotors driven by respective motors that can be controlled in a differentiated manner so as to pilot the drone in attitude and speed. Various aspects of these drones are described in particular in the WO 2010/061099 A2, EP 2 364 757 A1, EP 2 613 213 A1 or EP 2 613 214 A1 (Parrot SA).

An article of Timothy McDougal, published on Internet, entitled "The New Parrot Bebop Drone: Built for Stabilized Aerial Video" dated from Jun. 10, 2014 (XP055233862), describes in particular the above-mentioned Bebop Drone device, which is a drone provided with a fisheye lens associated with an image stabilization and control system.

The front video camera can be used in particular for an "immersive mode" piloting, i.e. where the user uses the image of the camera in the same way as if he was himself on board the drone. It may also serve to capture sequences of images of a scene towards which the drone is directed. The user can hence use the drone in the same way as a camera or a camcorder that, instead of being held in hand, would be borne by the drone. The images acquired can be recorded then broadcast, put online on video sequence hosting web sites, sent to other Internet users, shared on social networks, etc.

These images being intended to be recorded and communicated, it is desirable that they have the less defects possible, in particular defects caused by the behaviour of the drone, liable to generate oscillations, deformations or other untimely artefacts in the image captured by the camera. The appearance of such artefacts is however inherent to the mode of evolution of the drone, as any linear displacement of the drone forward, rearward or aside involves a tilting of the drone, and hence an undesirable corresponding effect of shifting, rotation, oscillation . . . of the image acquired by the camera.

These defects are tolerable in an "immersive piloting" configuration. On the other hand, if the matter is to use the drone as a mobile video camera to capture sequences that will be recorded and rendered latter, these defects are extremely troublesome, so that is it desirable to reduce them to a minimum.

In the case of the above-mentioned Bebop Drone, the latter implements a camera provided with a hemispherical-field lens of the fisheye type covering a field of about 180°, but only one part of the captured field of which is used, this part roughly corresponding to the angular sector captured by a conventional camera.

For that purpose, a particular window (hereinafter "image area") is selected in the raw image delivered as an output by the sensor (hereafter "capture area", which is itself a portion of the whole hemispherical image formed at the surface of the sensor). Characteristically, this window is a window mobile in rotation and in translation, permanently displaced as a function of the movements of the drone determined by the inertial central, and in the opposite direction with respect to the detected displacement. The image acquired by the fisheye lens of course undergoes the same oscillation and rotation movements as a conventional camera, but the displacement of the image area is feedback-controlled so as to compensate for these movements and to hence produce an image stabilized with respect to the drone movements.

A "virtual camera" is hence defined by extracting from the captured scene (the capture area) a particular area (the image area) that is dynamically displaced, in rotation and in translation, in the capture area in the opposite direction with respect to the movements of the drone so as to annihilate the oscillations that would otherwise be observed in the image.

The technique is described in the EP 2 933 775 A1 (Parrot).

The present invention aims to eliminate a particular defect that appears at the time of certain evolutions of the drone, when the latter is strongly inclined to the side.

This situation occurs in particular at the time of abrupt translations of the drone to the right or to the left, or at the time of very steep turns: these movements are created in particular by turnarounds about the roll axis of the drone, turnarounds that translate in the image into rotations of the scene captured by the camera in one direction or the other.

These rotations may be compensated for by a rotation in the opposite direction of the image area in the capture area. But it however appears that, when the angles of inclination of the drone are significant, there exists no position of the image area that makes it possible to fully generate a rectified view. Indeed, if the rotation of the image area is too significant, opposite corners or edges of this image area will "extend over" beyond the capture area defined in the hemispherical image, which will translate into the fugitive appearance of grey corners or edges in the rectified image delivered at the output of the correction module. These grey areas will of course disappear when the drone will have taken back a less inclined attitude, but a troublesome artefact will have been introduced and will stay visible over a sequence of images intended to be registered and later reproduced.

This situation also occurs when the user takes the drone in his hands with the motors stopped, and uses the latter as a conventional camera to film a scene by benefiting from the dynamic stabilization of the system: if he inclines the drone beyond a certain threshold, areas with missing pixels appear at the image boundaries, whereas the stabilization system gives the illusion that the camera has not been inclined.

The starting point of the invention essentially consists in providing several configurations of operation of the sensor, and in dynamically selecting the best adapted configuration as a function of the angle of inclination of the drone, so as to avoid, at the inclination correction processing, any extension of the image area beyond the region of the sensor initially selected to produce the image.

By "configuration of operation", it is meant a set of parameters of capture of the camera, including:
  the output resolution, i.e. the size, expressed in pixels, of the image transmitted as an output by the camera (image area);
  the capture resolution, i.e. the size, expressed in pixels, of the region acquired at the sensor surface (capture area); and the capture mode, i.e. the processing permitting to switch from the capture resolution to the output resolution.

The capture mode includes in particular the modes referred to as "normal" (where all the pixels acquired are transmitted as such at the output, the output resolution and the capture resolution being identical), "binning" (where the pixels acquired are grouped together into macropixels delivered as an output), and "scaling" (where the pixels are merged together by application of a filtering taking into account for each pixels the neighbours thereof in the image). The binning and scaling techniques permit in particular, compared to the normal mode, to produce an image from a wider captured surface, but at the cost of a loss of definition.

Usually, these capture parameters are fixed at the time of initialization of the camera. In concrete terms, with a configuration corresponding to that of the above-mentioned Bebop Drone, it is possible, in normal mode, to compensate for roll angles of ±15° without introducing areas devoid of pixels.

The problem of the invention is to increase the domain of stabilization beyond this range without loss of pixels (i.e. without appearance of grey corners or edges) and without degradation of the video flow fluidity (i.e. a constant framerate).

For that purpose, the invention essentially proposes to use several configurations of operation of the sensor and to dynamically select in course of image taking, as a function of the roll angle of the drone, the best adapted configuration to generate a full rectified view with an optimal image quality.

The principle consists in acting, for example, on different modes of the sensor (normal-binning-scaling) so as to temporarily increase (for example by switching from the normal mode to a binning or scaling mode) the surface of capture when the drone is strongly inclined. This modification will of course be made at the cost of a transitory degradation of the quality (due to the implementation of the binning or scaling mode) but without introduction of artefact (grey edges or corners) and without modification of the framerate, hence without degradation of the video flow fluidity.

More precisely, the invention proposes a motorized flying machine provided with a system for stabilizing the captured images comprising, in a manner known per se and described in particular in the above-mentioned article of McDougal:
- a camera linked to the drone body, said camera comprising:
  - a hemispherical-field lens of the fisheye type, and
  - a digital sensor acquiring the image formed by the lens, where only one part, located inside a capture area, of the pixels of the image formed on the sensor is captured to deliver raw pixel data;
- an inertial unit, adapted to measure the Euler angles describing the instantaneous attitude of the drone with respect to an absolute terrestrial reference system;
- an extractor module, receiving as an input said raw pixel data of said capture area and delivering as an output pixel data of an image area of reduced size inside the capture area and corresponding to an angular sector captured by a conventional camera; and
- a feedback-control module, receiving as an input angle values delivered by the inertial unit, and adapted to dynamically modify the position and the orientation of the image area inside the capture area, in the direction opposite to that of the changes of the angle values measured by the inertial unit.

Characteristically of the invention:
the sensor is a sensor able to operate according to a plurality of different configurations of operation, able to be dynamically selected during a same sequence of image taking of the camera, said configurations of operation comprising:
  a base configuration using a base capture area as a capture area, and
  at least one degraded mode configuration using as a capture area an extended capture area of greater size than the base capture area, with application to the pixels of the extended capture area of a conversion processing adapted to reduce the size of the extended capture area to that of the base capture area, and
it is further provided a compensator module, receiving as an input successive values of roll angle of the drone delivered by the inertial unit, and adapted to dynamically modify the current configuration of operation of the sensor so that the sensor operates:
  according to the base configuration for roll angle values lower than a first limit, and
  according to a degraded mode configuration for roll angle values higher than a second limit.

Preferably, the roll effect compensator means are adapted to dynamically modify the current configuration of operation of the sensor: from the base configuration to the degraded mode configuration when the roll angle value increases beyond a first predetermined threshold, and from the degraded mode configuration to the base configuration when the roll angle of the drone decreases under a second predetermined threshold, the second threshold being different from the first threshold and lower than the latter.

The configurations of operation may in particular comprise:
  the base configuration, using the base capture area as a capture area,
  a moderately degraded mode configuration using as a capture area a first extended capture area of greater size than the base capture area, with application to the pixels of the first extended capture area of a first conversion processing adapted to reduce the size of the first extended capture area to that of the base capture area, and
  a strongly degraded mode configuration using as a capture area a second extended capture area of greater size than the first extended capture area, with application to the pixels of the second extended capture area of a second conversion processing, different from the first processing, adapted to reduce the size of the second extended capture area to that of the base capture area.

The compensator module then dynamically modifies the current configuration of operation of the sensor such that the sensor operates: according to the base configuration for roll angle values lower than the first limit, according to the moderately degraded mode configuration for roll angle values higher than the second limit and lower than the third limit, and according to the strongly degraded mode configuration for roll angle values higher than the third limit.

An exemplary embodiment of the invention will now be described, with reference to the appended drawings in which the same references denote identical or functionally similar elements throughout the figures.

An exemplary embodiment of the invention will now be described.

Figure 1:
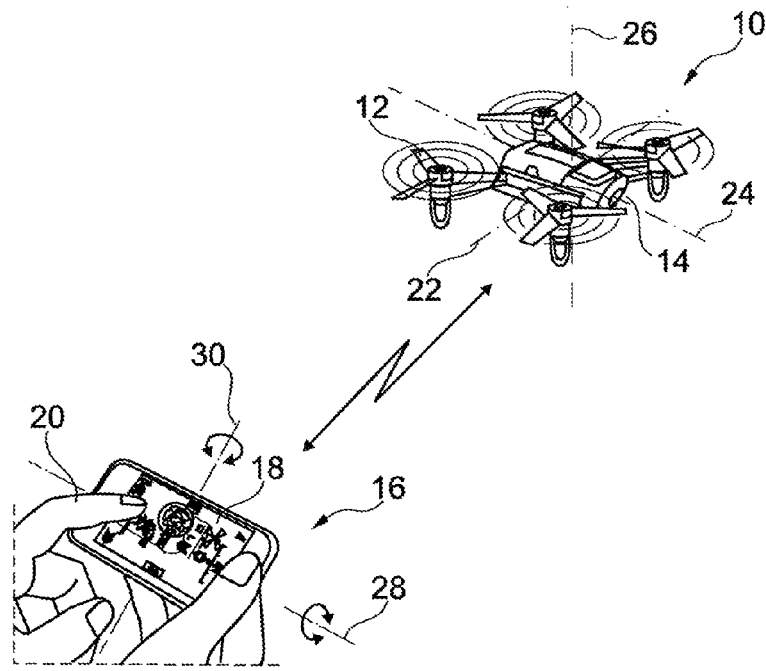
FIG. 1 is an overall view showing the drone and the associated remote-control device allowing the remote control thereof.

In FIG. 1, the reference 10 generally denotes a drone, that is for example a quadricopter such as the Bebop Drone model of Parot SA, Paris, France. This drone includes for coplanar rotors 12 whose motors are piloted independently from each other by an integrated navigation and attitude control system. It is provided with a front view camera 14 permitting to obtain an image of the scene towards with the drone is directed.

The drone also includes a vertical view camera (not shown) pointing downward, adapted to capture successive images of the overflown ground and used in particular to evaluate the speed of the drone with respect to the ground. Inertial sensors (accelerometers and gyrometers) permit to measure with a certain accuracy the angular speeds and the attitude angles of the drone, i.e. the Euler angles (pitch φ, roll θ and yawn ψ) describing the inclination of the drone with respect to a horizontal plan in a fixed terrestrial reference system. An ultrasound telemeter arranged under the drone moreover provides a measurement of the altitude with respect to the ground.

The drone 10 is piloted by a remote-control device 16 provided with a touch screen 18 displaying the image on board the front camera 14, with in superimposition a certain number of symbols allowing the activation of piloting commands by simple contact of a user's finger 20 on the touch screen 18. The device 16 is provided with means for radio link with the drone, for example of the Wi-Fi (IEEE 802.11) local network type, for the bidirectional exchange of data from the drone 10 to the device 16, in particular for the transmission of the image captured by the camera 14, and from the device 16 to the drone 10 for the sending of piloting commands.

The remote-control device 16 is also provided with inclination sensors allowing the control of the drone attitude by imparting to the device corresponding inclinations about the roll and pitch axes, it being understood that the two longitudinal and transverse components of the horizontal speed of the drone 10 will be closely linked to the inclination about the two respective pitch and roll axes. The piloting of the drone consists in making it evolve by:

a) rotation about a pitch axis 22, to make it move forward or rearward;

b) rotation about a roll axis 24, to shift it to the right or to the left;

c) rotation about a yaw axis 26, to make the main axis of the drone pivot to the right or to the left; and d) translation downward or upward by changing the gas control, so as to reduce or increase, respectively, the altitude of the drone.

When these piloting commands are applied by the user from the remote-control device 16, the commands a) and b) of pivoting about the pitch 22 and roll 24 axes are obtained by inclinations of the device 16 about its longitudinal axis 28 and transverse axis 30, respectively: for example, to make the drone move forward, it is just needed to incline the remote-control device 16 forward by tilting it about the axis 28, to move it aside to the right, it is just needed to incline the remote-control device 16 by tilting it to the right about the axis 30, etc. The commands c) and d) result from actions applied by contact of the user's finger 20 on corresponding specific areas of the touch screen 18.

The drone has also an automatic and autonomous system of hovering flight stabilization, activated in particular as soon as the user removes his finger from the touch screen of the device, or automatically at the end of the take-off phase, or in case of interruption of the radio link between the device and the drone.

Figure 2A:
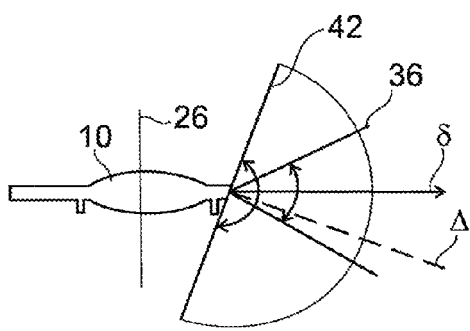
FIGS. 2a and 2b illustrate the modifications of the viewing direction of the camera caused by a forward tilting of the drone, for example during a phase of acceleration.

FIG. 2A schematically illustrates, in profile, the attitude of the drone when the latter is stationary, in a lift condition.

The field covered by a front camera 14 of the conventional type, for example a camera covering a field of 54° and whose sight axis δ is centred to the horizon is schematized in 36.

Figure 2B:
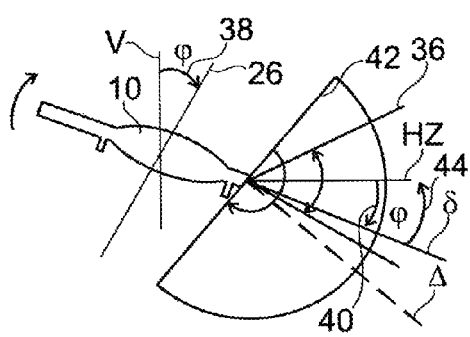

If, as illustrated in FIG. 2b, the drone moves forward with a non-zero horizontal speed, by design, the axis 26 of the drone will be inclined forward by an angle φ (pitch angle) with respect to the vertical V. This forward inclination, schematized by the arrow 38, involves an inclination of same value, schematized by the arrow 40, of the axis δ of the camera with respect to the plane of the horizon HZ. It is hence understood that, over the evolutions of the drone, as the latter speeds up or slows down, etc., the axis δ oscillates permanently about the direction of the horizon HZ, which will translate in the image into permanent upward and downward oscillation movements.

Comparably, if the drone moves aside to the right or to the left, this movement will be accompanied by a pivoting about the roll axis 24, which will translate in the image into rotations in one direction or the other of the scene captured by the camera.

To compensate for this drawback, it has been proposed, as explained in the above-mentioned EP 2 933 775 A1, to provide the camera with a hemispherical-field lens of the fisheye type covering a field of about 180°, as schematized in 42 in FIG. 2a. The image captured by the camera provided with this fisheye lens will of course be subjected to the same oscillation and rotation movements as a conventional camera but only a part of the field captured by this camera will be used by selecting a particular window, called a "capture area", corresponding to the angular sector 36 captured by a conventional camera, and that will be dynamically displaced in the hemispherical image in the opposite direction with respect to the movements of the drone as determined by the inertial central, so as to annihilate the oscillations that would otherwise be observed in the image.

Hence, in the case illustrated in FIG. 2b, where the drone dives downward by a pitch angle φ (arrow 38) with respect to the vertical V, the capture window will be displaced upward (arrow 44) by an angle of same value, hence returning back towards the horizon HZ the central axis of the sector 36 of a "virtual camera" covering the field corresponding to the image area.

As illustrated in the figures, insofar as the forward movements of the drone are more frequent than the rearward ones and that, on the other hand, the areas of interest (overflown ground) are located under the level of the drone rather than above the latter, it may be advantageous to incline downward the main axis A of the fisheye lens (for example by a site angle of −20°), so as to cover a greater number of configurations of evolution of the drone and to do so that the sector 36 corresponding to the capture area of the "virtual camera" always remains in the field 42 of the fisheye lens.

Figure 3:
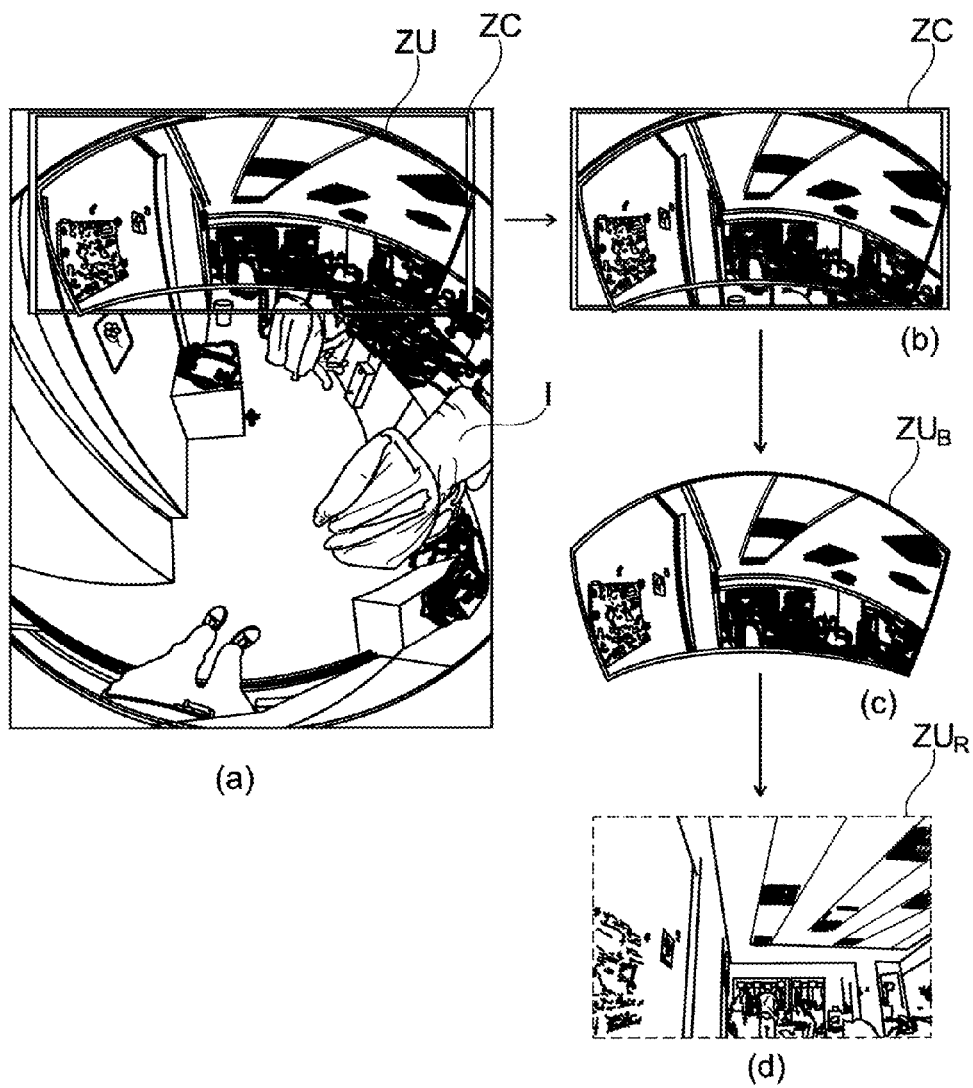
FIG. 3 is an example of image formed on the sensor of the drone camera, illustrating the successive steps (a) to (d) of windowing and correction of the distortions applied to this image so as to produce a rectified image.

FIG. 3 shows in (a) an example of scene, as detected on the sensor of the video camera provided with the fisheye lens.

As can be seen, the image I of this scene includes very high geometric distortions, inherent to the hemispherical or quasi-hemispherical coverage of the fisheye lens, which is rectified on the planar surface of the sensor.

Only a part of the image I produced by the fisheye lens is used. This part is determined as a function i) of the direction to which the "virtual camera" is pointed, ii) of the field of view of the latter (schematized in 36 in FIGS. 2a and 2b), and iii) of the width/height ratio thereof. A "capture area" ZC containing raw pixel data is hence defined, which includes the "useful area" ZU corresponding to the field of the virtual camera after compensation of the geometric distortions introduced by the fisheye lens.

It will be noted that it is not useful to capture the totality of the pixels of the image I formed on the sensor, but only a fraction of these latter, corresponding to the capture area ZC. Hence, if it is desired to obtain for example an image of HD quality (1920×1080 pixels, i.e. 2 Mpixel for the useful area ZU), it is necessary to have at the beginning a fisheye image of very high resolution so as to be able to extract a HD view of good quality whatever the direction to which the virtual camera points, which implies to have a sensor whose resolution will be typically of 14 Mpixel (4608×3288 pixels). In such conditions, if the totality of the image I were transferred for processing, this would correspond to a flow of pixel data of 14 Mpixel for each image, leading to a framerate of the order of 6 images per second (ips) at this resolution, which would be insufficient for a fluid video sequence (imposing a framerate close to 30 ips). Hence, only the really necessary pixel data of the capture area ZC are transferred, for example a capture window ZC of about 2 Mpixel, which may be refreshed at a rate of 30 ips with no particular difficulty. A high-resolution sensor may hence be chosen while keeping a high image flow rate.

The views (a)-(d) of FIG. 3 illustrate the different processes operated on the pixel data of the capture area ZC to obtain the final image, compensated for the geometric distortions.

Based on the pixel data transferred from the capture area ZC (view (b)), the process extracts the pixel data from the raw useful area $ZU_B$ (view (c)) and applies thereto a triangle meshing (technique known by itself), which will permit to rectify the image by stretching each triangle to give a rectified useful image $ZU_R$ (view (d)) with rectified pixel data. In particular, the strongly curved horizontal lines of the fisheye image will be corrected so as to make them rectilinear and to produce an image corresponding to a natural vision, devoid of geometric distortions.

The present invention aims to remedy a particular drawback that appears at the time of extraction of the image area ZI from the captured area ZC, when the roll angle of the drone (rotation about the longitudinal axis 24) is significant, typically when it exceeds values of the order of 15°. This may occur in particular at the time of abrupt lateral translations of the drone to the right or to the left, or at the time of very steep turns in one direction or the other (the inclination according to a roll angle being then combined with an inclination according to the pitch angle, the latter being all the more great that the horizontal speed of the drone is high).

Figure 4A:
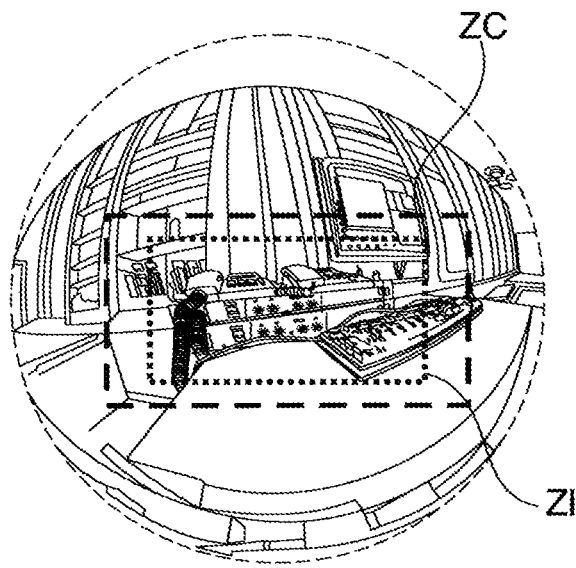
FIGS. 4a and 4b illustrate the phenomenon occurring when the roll angle of the drone is significant and when there exists no position of the capture window making it possible to generate a full rectified view.
Figure 4B:
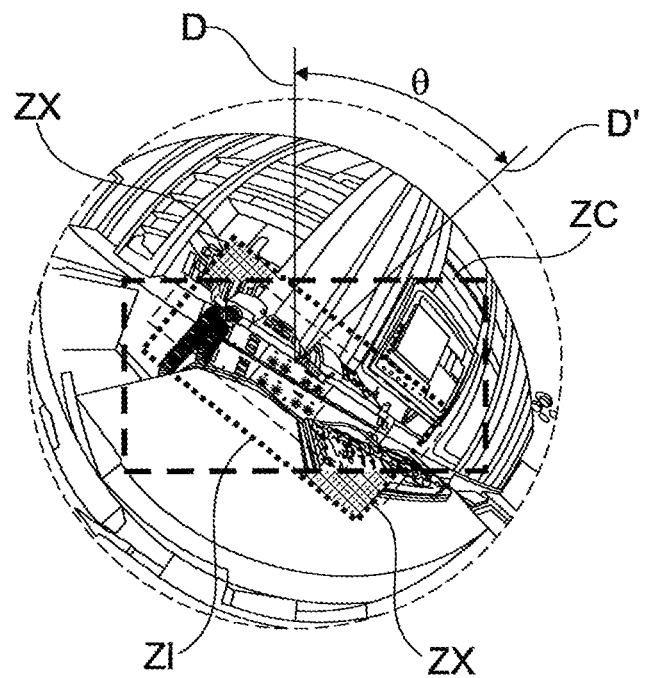

This phenomenon is illustrated in FIGS. 4a and 4b: when the pitch of the drone is horizontal (attitude corresponding to a hovering flight), the image acquired at the surface of the sensor is that illustrated in FIG. 4a, with a rectangular capture area ZC centred to the hemispherical image produced by the fisheye lens, and a rectangular image area ZI of smaller size, located inside the capture area ZC and centred in the same manner.

In the case of a change of attitude of the drone with rotation of the drone to the left or to the right about its roll axis, for example a rotation to the right by an angle θ as illustrated in FIG. 4b, the image formed on the sensor undergoes a corresponding rotation.

But, for values of roll angle exceeding a certain threshold, the image area ZI will no longer be able to be full inscribed inside the capture area ZC, and two opposite corners ZX of this image area ZI will extend over beyond the capture area ZC. In these areas ZX, no pixel data will be delivered (as the pixels of the sensor that will be extracted and delivered at the output of the camera are limited to the capture area ZC), which will translate in the final image into two grey areas in two corresponding opposite corners. Even if these grey areas appear only in a very fugitive manner during the evolution of the drone, they however constitute a troublesome artefact, which will remain visible in the sequence of images intended to be registered and later reproduced.

The same phenomenon appears if the drone is simply used in stopped state and held in hand to be used as a simple camera: if the drone (the camera) is too inclined about its longitudinal axis, the artefact of the grey areas ZX will be present as long as this excessive inclination will last.

To make up for this drawback, the invention proposes to dynamically switch between different configurations of operation of the sensor.

By "configuration of operation", it is meant, as indicated in introduction, a set of parameters of capture of the camera including:
- the output resolution, i.e. the size, expressed in pixels, of the image transmitted as an output by the camera (image area ZI);
- the capture resolution, i.e. the size, expressed in pixels, of the area acquired at the surface of the sensor (capture area ZC); and
- the capture mode, i.e. the processing permitting to switch from the capture resolution to the output resolution.

For the latter parameter, the digital cameras generally propose several modes of acquisition of the video data, the most common of which are:
- the "normal" mode, in which all the pixels acquired within a given window are transmitted as such at the output of the sensor. The capture resolution is hence identical to the output resolution and the quality of the image is maximal;
- the so-called "binning" mode, in which the neighbour pixels are electrically grouped together to form macropixels, and those macropixels are delivered at the output as pixel data. It hence becomes possible in a comparable acquisition time (hence with no effect on the fluidity of the video sequence) to capture a wider surface, but at the cost of an important loss of definition, of at least 50%. Indeed, the pixels are grouped together at least two by two horizontally and/or vertically to form the macropixel by averaging the individual pixels;

the so-called "scaling" mode, which permit to more finely adjust the level of reduction than the binning mode. Indeed, whereas the binning is limited to ratios of the $2^n$ type, as it acts by pixel grouping, the scaling operates a software reduction with filtering of each individual pixel as a function of the value of the neighbour pixels. Reductions by a factor ¾, ⅔, etc. can hence be performed, with an image produced with a best quality than in binning mode. On the other hand, this mode is slower because, to reduce the image, significant calculations are required, and all the pixels of the captured surface must be acquired to perform the filtering.

Figure 5:
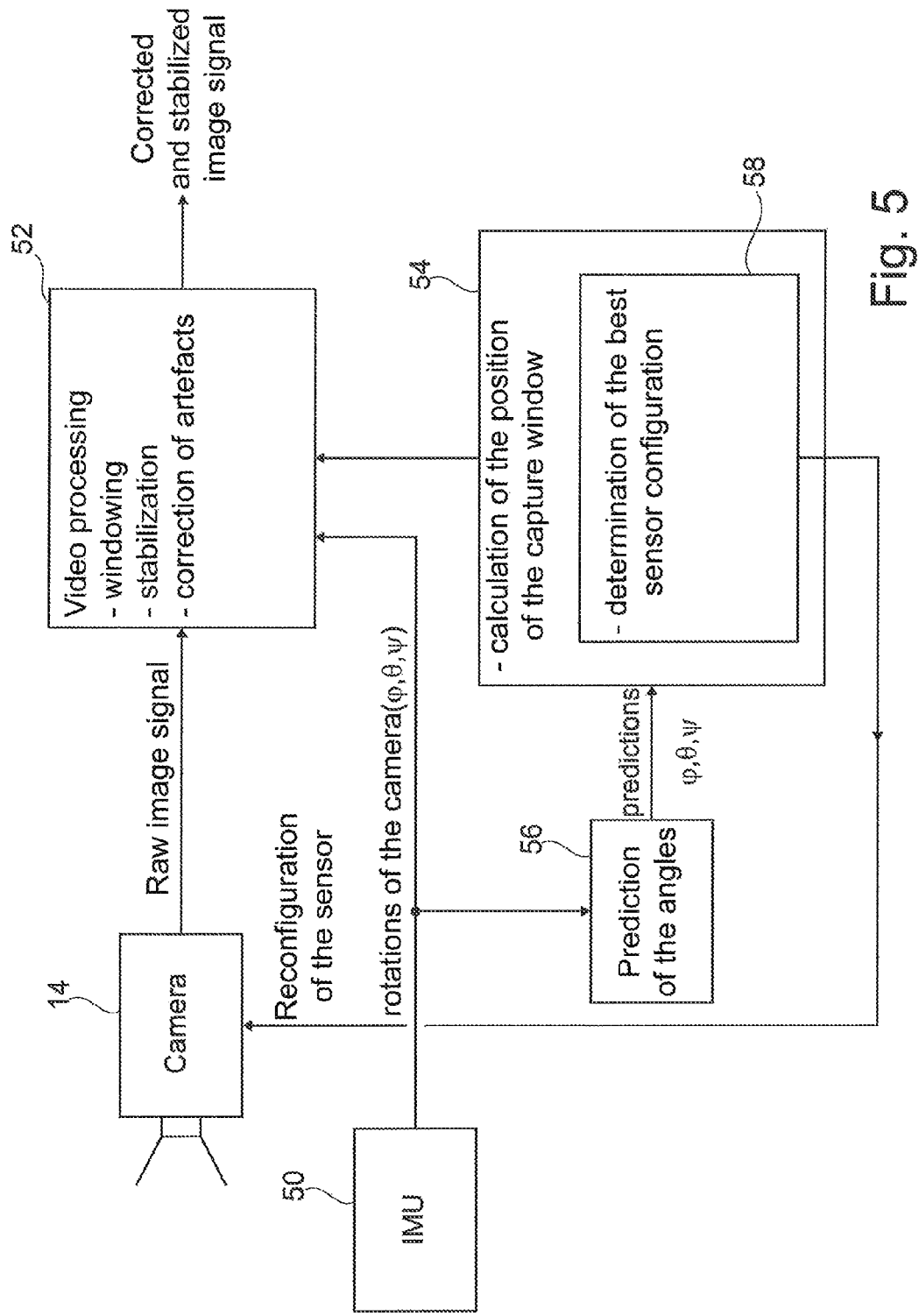
FIG. 5 illustrates as a block diagram the different elements permitting to perform, according to the invention, the dynamic selection of the configurations of operation of the sensor.

FIG. 5 illustrates, as a block-diagram, the different elements of an image processing circuit permitting to control, according to the invention, the dynamic switching of the configurations of operation.

The camera 14 of the drone is subjected to angular displacements. These displacements are measured by an inertial unit IMU 50 delivering signals representative of the instantaneous rotations of the drone and hence of the camera, the inertial unit 50 and the camera 14 being mechanically fastened together. These rotations are given by the pitch $\varphi$, roll $\theta$ and yawn $\psi$ angles that describe the inclination of the drone in the three dimensions with respect to a fixed terrestrial reference system (Euler angles).

Those rotation measurements are applied to a video processing module 52 ensuring the windowing, the image stabilisation and the correction of the artefacts of the raw image signal delivered by the camera 14. The module 52 delivers as an output a corrected and stabilized image signal, which could then be transmitted to the user for visualization on a remote screen, recording into a digital memory, etc. The windowing performed by the module 52 is controlled by a module 54 insuring the calculation of the position of the capture window ZC in the hemispherical image formed on the digital sensor, from predictions of the rotation angles $\varphi$, $\theta$ and $\psi$ delivered by a predictor module 56 receiving as an input the instantaneous values of the rotations of the drone delivered by the inertial unit 50. This data is delivered at the frequency of acquisition of the gyrometers, typically a frequency of 990 Hz, very higher than the frequency of acquisition of the images by the video camera, typically a frequency of 30 Hz.

Characteristically of the invention, the module 54 also includes a module 58 for selecting the best configuration of the sensor, as a function of the roll angle predicted by the module 56.

Figure 6:
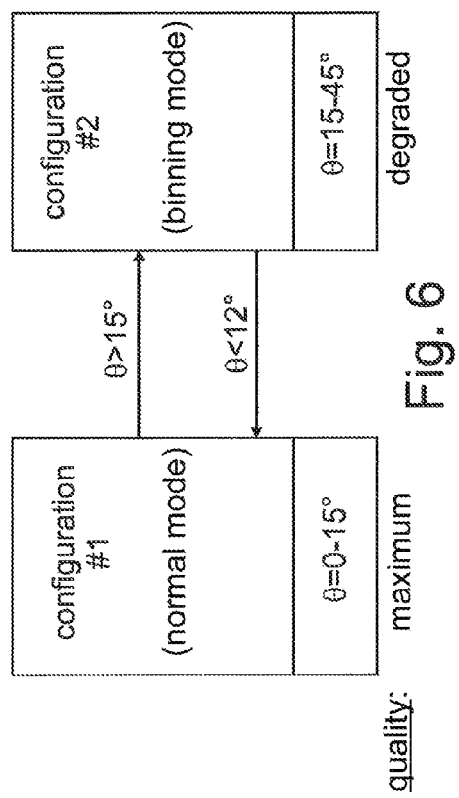
FIG. 6 is a schematic representation illustrating the selection between two different possible configurations as a function of the roll angle of the drone.

FIG. 6 schematically illustrates how this selection is operated as a function of the roll angle of the drone, between two different possible configurations, for example:

a "normal mode" configuration, when the roll angle $\theta$ is lower than 15°. The selected configuration ensures a maximal quality, for example with an output and capture resolution equal to 1408×2112 pixels; and a degraded mode configuration, for example a "horizontal binning" mode configuration if the roll angle $\theta$ exceeds the threshold (for example, a threshold of $\theta$=15') that does not make it possible to generate a full image area (as exposed hereinabove with reference to FIGS. 4a and 4b). The degraded mode configuration provides for example a capture resolution of 2816×2112 pixels to obtain an output resolution of 1408×2112 pixels.

If the threshold is crossed, the module 58 then sends to the camera 14 a signal of sensor reconfiguration causing the latter to operate with a lower quality, but a more extended capture area. This degraded quality configuration in binning mode is kept as long as the roll angle $\theta$ exceeds the above-mentioned threshold. Preferably, to avoid multiple switching phenomena around the threshold, it is provided to introduce an hysteresis, by triggering the return back to the normal mode configuration only if the roll angle goes down for example under 12° (whereas the reverse tilting had been controlled when this angle was above 15°).

Figure 7:
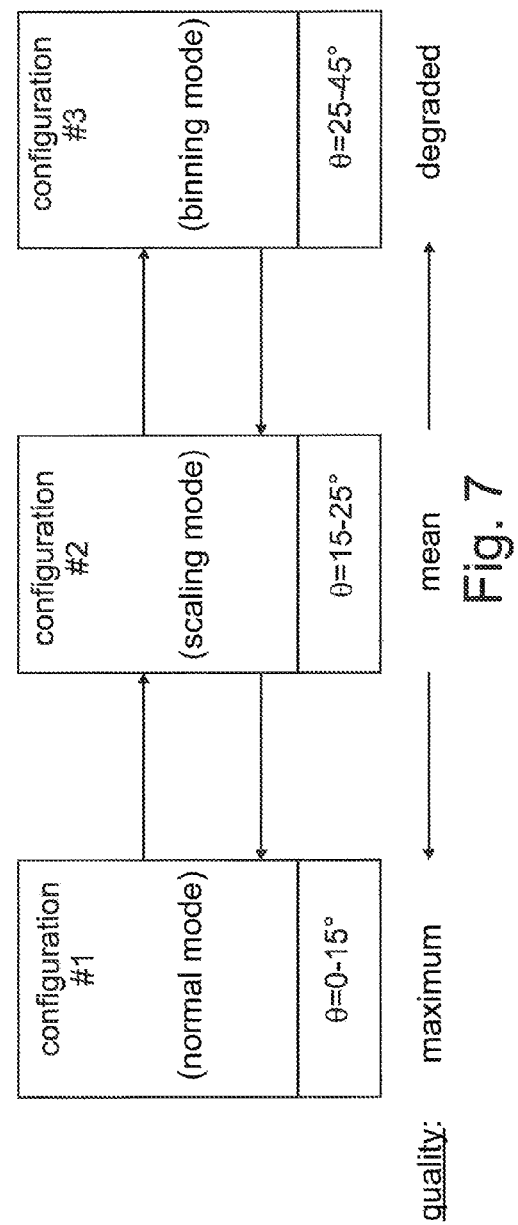
FIG. 7 is a schematic representation illustrating the selection between three different possible configurations as a function of the roll angle of the drone.

FIG. 7 is similar to FIG. 6, for three different possible configurations, comprising for example a median configuration in scaling mode with a moderately degraded quality, intermediate between the maximal quality of the normal mode and the more strongly degraded quality of the binning mode.

The switching between the three modes is operated in the same way as above, for example based on roll angle ranges of 0-15° for the normal mode, 15-25° for the scaling mode and 25-45° for the binning mode, with, in each case, introduction of an hysteresis at the switching from one configuration to the other.

FIGS. 8a to 8e illustrate an example of switching between two different configurations, maximal and degraded, in a scenario where the drone is first in a flat state, leans slightly then in a more pronounced manner, before coming back to a flat state.

In these figures, the image area ZI is indicated in dotted line and the capture area in dot-and-dash line. This capture area may be an base capture area ZCB when the camera operates in normal mode, or an extended capture area ZCE when the camera operates in degraded mode, for example in 2×2 binning mode with an extended capture surface ZCE four times more extended than the base capture area ZCB.

Initially (FIG. 8a), the drone is horizontal, which typically corresponds to a hovering flight situation. The roll angle $\theta$ is of 0° and the axes D of the base capture area and B' of the image area ZI are merged together.

When the drone leans slightly, with a roll angle $\theta$ lower than 15°, for example a roll angle $\theta$=12° (FIG. 8b), the image area ZI remains inscribed in totality in the base capture area ZCB.

When the drone leans in a more pronounced manner (FIG. 8c), for example with a roll angle $\theta$=30°, the base capture area ZCB can no longer contain the image area ZI, which extends over into the non-captured areas ZX. The sensor then switches to a low-definition configuration (binning or scaling) with an extended capture area ZCE that will always be able to contain the image area ZI, even in the most extreme configurations (up to $\theta$=45°).

Figure 8A:
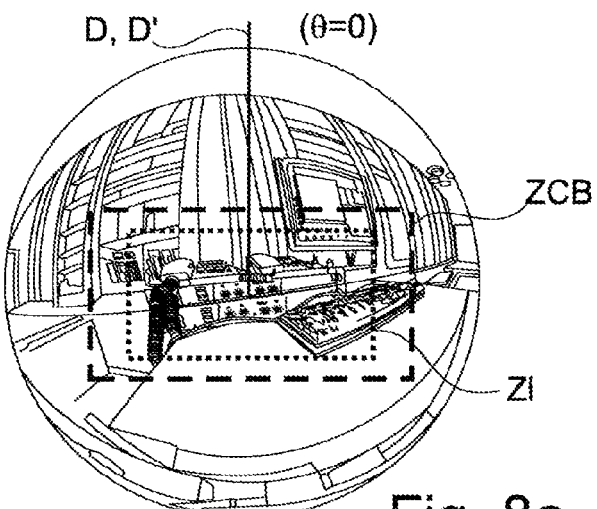
FIGS. 8a to 8e are views explaining the following steps of modification of the configuration of operation of the sensor, for an example of roll oscillating movement of the drone from the horizontal and with return back to the original attitude.
Figure 8B:
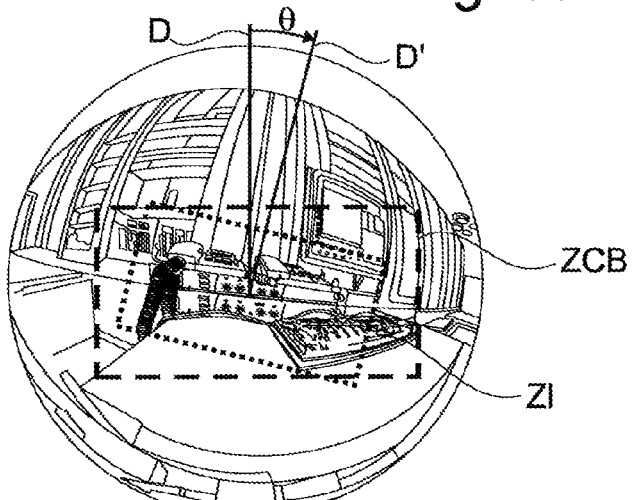
Figure 8C:
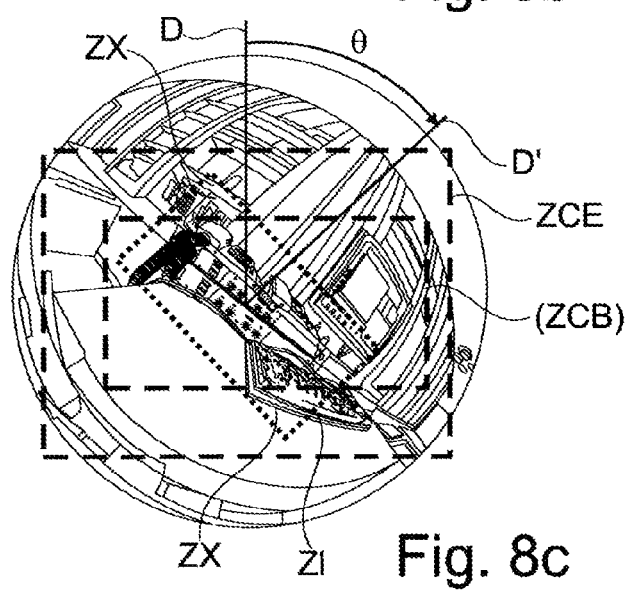
Figure 8D:
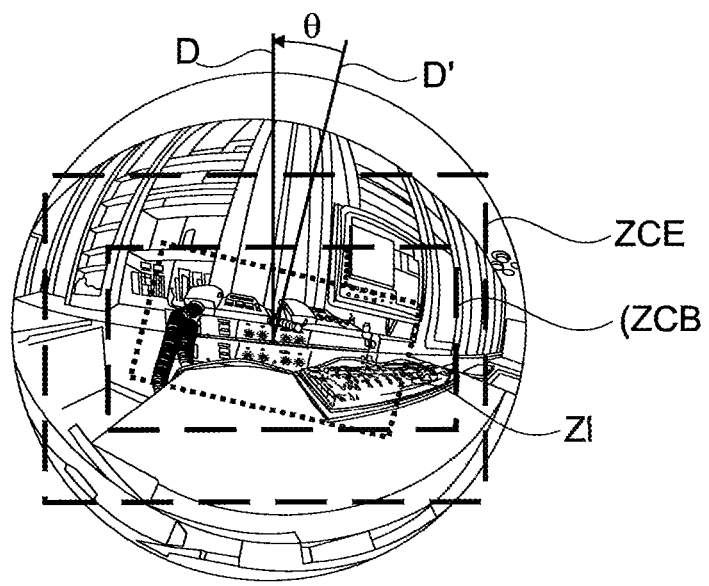
Figure 8E:
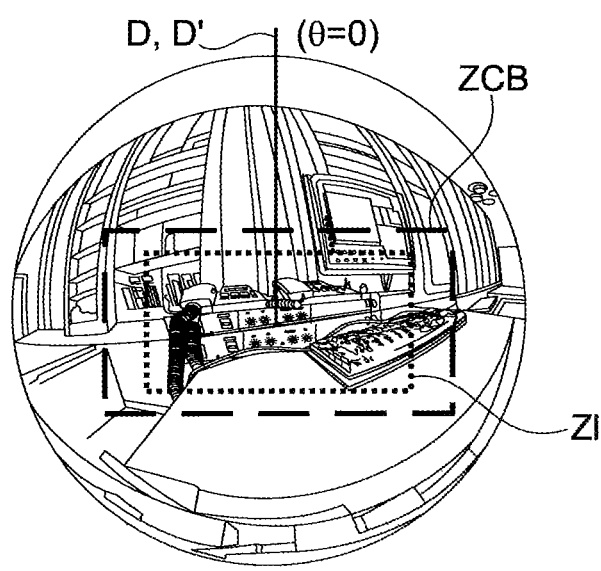

When the drone performs the reverse operation, the configuration is kept until reaching a roll angle $\theta$=12° (FIG. 8d). It will be noted that, in FIG. 8d, the inclination is the same as in FIG. 8b, but that the capture area remains the extended capture area ZCE (hysteresis effect). Indeed, if we come back too early to the normal mode, the margin of error will be too low to be sure that the surface of the capture area will always be sufficient to contain the image area.

This is only when this margin of error will be high enough (FIG. 8e) that it will be possible to operate the reverse switching of the sensor to the normal mode, with a maximal quality.

It is hence observed that, in any case, even when the roll becomes significant, the stabilized view is always generated with no missing pixel in the image. When the binning mode is used (situation of FIGS. 8c and 8d), the image of course becomes slightly more blurred, but this modification, which is very fugitive, is almost imperceptible, in any case far less than a loss of pixels that would translate into grey bands or corners in the final image delivered to the user.

The invention claimed is:

1. A motorized flying machine such as a drone (10) provided with a system for stabilizing the captured images comprising:
   a camera (14) linked to the drone body, said camera comprising:
      a hemispherical-field lens of the fisheye type, and
      a digital sensor acquiring the image formed by the lens, where only one part, located inside a capture area (ZC), of the pixels of the image formed on the digital sensor is captured to deliver raw pixel data;
   an inertial unit (50), adapted to measure the Euler angles ($\varphi$, $\theta$, $\psi$) describing the instantaneous attitude of the drone with respect to an absolute terrestrial reference system;
   an extractor module (52), receiving as an input said raw pixel data of said capture area (ZC) and delivering as an output pixel data of an image area (ZI) of reduced size inside the capture area and corresponding to an angular sector (36) captured by a conventional camera; and
   a feedback-control module (54, 56), receiving as an input angle values delivered by the inertial unit, and adapted to dynamically modify the position and the orientation of the image area inside the capture area, in the direction opposite to that of the changes of the angle values measured by the inertial unit,
characterized in that:
   the digital sensor is able to operate according to a plurality of different configurations of operation, able to be dynamically selected during a same sequence of image taking of the camera, said configurations of operation comprising:
      a base configuration using a base capture area (ZCB) as a capture area (ZC), and
      at least one degraded mode configuration using as a capture area (ZC) an extended capture area (ZCE) of greater size than the base capture area (ZCB), with application to the pixels of the extended capture area of a conversion processing adapted to reduce the size of the extended capture area to that of the base capture area, and
   it is further provided a compensator module (58), receiving as an input successive values of roll angle ($\theta$) of the drone delivered by the inertial unit, and adapted to dynamically modify the current configuration of operation of the digital sensor so that the digital sensor operates:
      according to the base configuration for roll angle values ($\theta$) lower than a first limit, and
      according to a degraded mode configuration for roll angle values ($\theta$) higher than a second limit,
   wherein the compensator module is adapted to dynamically modify the current configuration of operation of the digital sensor:
      from the base configuration to the degraded mode configuration when the roll angle value increases beyond a first predetermined threshold,
      and from the degraded mode configuration to the base configuration when the roll angle of the drone decreases under a second predetermined threshold, the second threshold being different from the first threshold and the second threshold being lower than the first threshold.

2. The drone of claim 1, wherein the configurations of operation comprise:
   the base configuration (Configuration #1), using the base capture area (ZCB) as a capture area (ZC),
   a moderately degraded mode configuration (Configuration #2) using as a capture area (ZC) a first extended capture area of greater size than the base capture area, with application to the pixels of the first extended capture area of a first conversion processing adapted to reduce the size of the first extended capture area to that of the base capture area, and
   a strongly degraded mode configuration (Configuration #3) using as a capture area (ZC) a second extended capture area of greater size than the first extended capture area, with application to the pixels of the second extended capture area of a second conversion processing, different from the first processing, adapted to reduce the size of the second extended capture area to that of the base capture area,
and wherein the compensator module is further adapted to dynamically modifies the current configuration of operation of the digital sensor such that the digital sensor operates:
   according to the base configuration for roll angle values lower than the first limit,
   according to the moderately degraded mode configuration for roll angle values higher than the second limit and lower than the third limit, and
   according to the strongly degraded mode configuration for roll angle values higher than those of the third limit.

* * * * *